(12) United States Patent
Mizusawa

(10) Patent No.: US 7,554,573 B2
(45) Date of Patent: Jun. 30, 2009

(54) DRIVE ASSISTING SYSTEM

(75) Inventor: Kazufumi Mizusawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 10/488,458

(22) PCT Filed: May 23, 2003

(86) PCT No.: PCT/JP03/06482

§ 371 (c)(1),
(2), (4) Date: Mar. 3, 2004

(87) PCT Pub. No.: WO03/107273

PCT Pub. Date: Dec. 24, 2003

(65) Prior Publication Data

US 2004/0260469 A1    Dec. 23, 2004

(30) Foreign Application Priority Data

Jun. 12, 2002    (JP)    ............... 2002-171484

(51) Int. Cl.
*H04N 7/18* (2006.01)
*G05D 1/00* (2006.01)
*G01C 21/00* (2006.01)
*G06K 9/36* (2006.01)

(52) U.S. Cl. .................. 348/115; 348/148; 348/113; 348/224.1; 701/1; 701/200; 382/276; 382/254; 382/309

(58) Field of Classification Search ............. 348/148, 348/36
See application file for complete search history.

(56) References Cited

U.S. PATENT DOCUMENTS 5,949,331 A * 9/1999 Schofield et al. ............ 340/461
6,498,620 B2 * 12/2002 Schofield et al. ............ 348/148
6,509,832 B1 * 1/2003 Bauer et al. ............... 340/425.5
7,034,861 B2 * 4/2006 Okada et al. ................. 348/36
7,161,616 B1 * 1/2007 Okamoto et al. ............ 348/148
2003/0030724 A1 * 2/2003 Okamoto ..................... 348/148

FOREIGN PATENT DOCUMENTS

EP    1179958 A1 *    2/2002
JP    2002-83285    3/2002

* cited by examiner

*Primary Examiner*—Vivek Srivastava
*Assistant Examiner*—Jun Fei Zhong
(74) *Attorney, Agent, or Firm*—Pearne & Gordon LLP

(57) ABSTRACT

An object of the present invention is to provide a driving assistance system capable of displaying a picked-up image near a vehicle as a less-distorted image on a monitor.

A driving assistance system according to the present invention comprises an imaging means (2) for picking up a surrounding image of a vehicle (1) on a road surface, an image translating means (3) for executing an image translation by using a three-dimensional projection model (300), which is convex toward a road surface side and whose height from the road surface is not changed within a predetermined range from a top end portion of the vehicle (1) in a traveling direction, to translate the image picked up by the imaging means (2) into an image viewed from a virtual camera (2a), and a displaying means (4) for displaying an image translated by the image translating means (3). The three-dimensional projection model (300) is configured by a cylindrical surface model (301) that is convex toward the road surface side, and a spherical surface model (302) connected to an end portion of the cylindrical surface model (301). Accordingly, the straight line on the road surface, which is in parallel with the center axis of the cylindrical surface model (301), is displayed as the straight line, and thus a clear and less-distorted screen can be provided to the driver.

17 Claims, 8 Drawing Sheets

MODEL 506

MODEL 521

MODEL 522

PRIOR ART *FIG. 14*

DRIVE ASSISTING SYSTEM

TECHNICAL FIELD

The present invention relates to a driving assistance system which assists when a vehicle backs by displaying a vehicle rear-side image picked up by a camera equipped with the vehicle on a monitor equipped with the vehicle and, more particularly, to a driving assistance system which displays a less distorted image on the equipped monitor thereby not causing a driver to feel a sense of incompatibility.

BACKGROUND ART

A driving assistance system which installs an equipped camera backward in a rear trunk portion or the like of a vehicle and provides an image of a rear side of the vehicle picked up by the equipped camera to the driver is spreading nowadays. Some of the driving assistance systems translates/synthesizes a real image picked up the equipped camera into an image that looks as if such image is picked up from a viewpoint being set virtually and displays a resultant image on a monitor, and the driving assistance systems are mainly used for the purpose of the safety check and the parking assistance in backing the vehicle.

As a three-dimensional projection model used to synthesize/translate the image, for example, as shown in FIG. 10, a three-dimensional projection model 100 configured to have a cylindrical surface model 101 and a flat surface model 102 is used. Then, a real image picked up by a real camera 103 is translated/synthesized into an image viewed from a virtual camera 104, and then is displayed as an image projected onto the three-dimensional projection model 100 on an equipped monitor.

FIG. 11 is an explanatory view showing an image obtained by projecting a straight line 105 shown in FIG. 10 onto the three-dimensional projection model 100. A straight line image 105a on a monitor screen 106 is displayed to be folded at a model boundary 107 between the cylindrical surface model 101 and the flat surface model 102. In this manner, the reason for that originally straight line 105 is translated as a folded image 105a when the three-dimensional projection model 100 configured to combine the cylindrical surface onto which the far image is projected and the flat surface onto which the near image is projected is used is that distortion of the display is concentrated onto the model boundary 107 between two three-dimensional projection models 101, 102. Thus, when the driver looks at this folded image 105a, he or she perceives a sense of incompatibility.

Therefore, if two three-dimensional projection models are smoothly connected by a curved surface (third three-dimensional projection model), the straight line image 105a is smoothly curved, as shown in FIG. 12, and it is possible to relax the sense of incompatibility. However, since the distortion is concentrated onto a projection surface 108 onto the third three-dimensional projection model, a sense of incompatibility still remains.

Therefore, in the prior art set forth in JP-A-2002-83285, for example, the three-dimensional projection model shown in FIG. 13 is proposed. This three-dimensional projection model 200 is configured to have the cylindrical surface 101 onto which the far image is projected, and a spherical surface model 201 which is successively connected to this surface and onto which the near image is projected. In this manner, since the spherical surface model 201 is used as the model on which the picked-up image near the vehicle is projected, an overall projected image on the spherical surface model 201 changes smoothly and therefore a sense of incompatibility of the driver can be considerably relaxed.

However, if the above three-dimensional projection model 200 shown in FIG. 13 is used, the picked-up image near the vehicle is never distorted at the particular portion concentrated, but it occurs a problem that the distortion is generated in the overall image. For example, the image obtained by picking up an image of a lattice pattern on the ground 202 by the real camera 103 and then projecting the picked-up image onto the spherical surface model 201 is distorted as a whole, as shown in FIG. 14. That is, there is a problem such that a group of straight lines constituting originally a lattice on the ground 202 are displayed as a group of curved lines on the screen 106, and it is difficult to grasp positional relationships between the driver's own vehicle and the surroundings based on such image.

An object of the present invention is to provide a driving assistance system in which a three-dimensional projection model capable of monitoring/displaying a surrounding image of a vehicle as a less distorted image while suppressing incompatibility with a distant image from the vehicle is installed.

DISCLOSURE OF INVENTION

In order to attain the above object, a driving assistance system of the present invention has imaging means for picking up a surrounding image of a vehicle on a road surface; image translating means for executing an image translation by using a three-dimensional projection model, in which a shape on a side of the road surface is convex and a height from the road surface does not vary within a predetermined range from a top end portion of the vehicle in a traveling direction, to translate the image picked up by the imaging means into an image viewed from a virtual viewpoint; and displaying means for displaying an image translated by the image translating means.

According to this configuration, in the driving assistance system of the present invention, the straight line such as the box of the parking lot, or the like depicted in parallel with the traveling direction of the vehicle on the road surface near the vehicle is displayed as the straight line on the screen of the displaying means, and thus it becomes easy to grasp the relative positional relationship between the driver's own vehicle and the surroundings.

Preferably, a projection surface that gradually gets up from the road surface in a range extending beyond the predetermined range in a width direction of the vehicle is continuously provided in the three-dimensional projection model. According to this configuration, the picked-up image in a wide range in the width direction of the vehicle can be displayed on the screen not to make the image distortion prominent.

Preferably, a projection surface that gradually gets up from the road surface in a range extending beyond the predetermined range in the traveling direction of the vehicle is continuously provided in the three-dimensional projection model. According to this configuration, the picked-up image in a wide range in the traveling direction of the vehicle can be displayed on the screen not to make the image distortion prominent.

More preferably, the three-dimensional projection model is formed by successive curved surfaces that can be differentiated in a full range except end points. According to this configuration, no discontinuous singular point is present on the screen, and a sense of incompatibility caused by connecting a plurality of three-dimensional models (the cylindrical surface and the spherical surface) is not generated. Also, a scale factor or a distortion can be varied on the screen by adjusting an inclination of the convex surface, and thus a sense of distance and a sense of direction on the screen can be adjusted by utilizing this. In addition, since all three-dimensional models are a smooth curved surface that is convex downward, the image distortion is not concentrated into a particular portion but dispersed over the entire screen to provide a clear screen. Therefore, the image by which the driver easily grasps the sense of distance and from which the driver does not feel a sense of incompatibility can be provided to the driver.

More preferably, the three-dimensional projection model has a cylindrical surface which shape on the side of the road surface is convex, and a spherical surface which is smoothly connected to an end portion of the cylindrical surface. According to this configuration, the three-dimensional projection models can be represented by equations, and thus the image translating process and formation of the mapping table can be made easy.

More preferably, the predetermined range is projected onto the cylindrical surface to has a length in the traveling direction of the vehicle, which is set to 120% or less of 5 m that is a length of a normal box of a parking lot, and a width, which is set to a range of 80% to 120% of 3 m that is a width of the normal box of the parking lot. According to this configuration, the screen that is suited to the parking operations can be provided to the driver.

More preferably, the cylindrical surface is a cylindrical surface of an ellipse, and the ellipse whose ratio of a maximum width and a minimum width between equal-interval lattice lines, which are in parallel with a center axis of the cylindrical surface on the road surface projected onto the cylindrical surface, is at least 80% in the predetermined range is used as the three-dimensional projection model. According to this configuration, the screen that has a small distortion can be provided to the driver.

More preferably, the three-dimensional projection model and a position of the virtual viewpoint are set such that both left and right ends of a rear end image of the vehicle displayed on a screen of the displaying means enter into an at least 15% range of a screen width from both end positions of the screen. According to this configuration, the image of the blind spot position, which cannot be directly viewed by the driver, is displayed largely on the screen, and thus the driver can drive with a sense of security.

More preferably, the three-dimensional projection model and a position of the virtual viewpoint are set such that a linear shape of a rear end of the vehicle in the predetermined range is displayed as a linear image on the screen of the displaying means. According to this configuration, the driver can easily confirm a shape of a bumper, etc. of the driver's own vehicle, and the driver can exactly grasped the positional relationship between the road surface and the driver's own vehicle. In addition, since positions of the three-dimensional projection model and the virtual viewpoint are set such that left and right both ends of the rear end image of the vehicle displayed on the screen on the displaying means enter into an at least 15% range off the screen width from both end positions of the screen, the image of the rear portion of the vehicle such as the bumper, etc., which is displayed larger than a width of the vehicle on the road surface on the screen obtained by the viewing translation, is cut off to have an appropriate width in response to the width of the screen and then displayed. Therefore, it is possible to reduce a factor of the sense of incompatibility such that a width of the vehicle on the road surface and a width of the bumper are largely differently displayed.

More preferably, a guide line indicating a straight line on the road surface, which is in parallel with the traveling direction of the vehicle and indicates an outer side that is outer than the width of the vehicle by a predetermined value, is superposed on an image translated by using the three-dimensional projection model and to display on the screen of the displaying means. According to this configuration, the driver can intuitively catch the relative positional relationship between the guide line and the straight line on the road surface from the screen, and thus the operation of aligning the position to the mark such as the side line of the box of the parking lot, the road surface, etc. in the parking is made easy.

More preferably, the image translating means translates the picked-up image by using a mapping table in which a translation address based on the three-dimensional projection model is stored. According to this configuration, it is not required to execute the computing process by using the three-dimensional projection model every time, and thus the image translating process can be carried out at a high speed.

BRIEF DESCRIPTION OF DRAWINGS

FIG. 14 is a schematic view showing an image distortion caused by the three-dimensional projection model in FIG. 13 used in the driving assistance system in the prior art.

Figure 1:
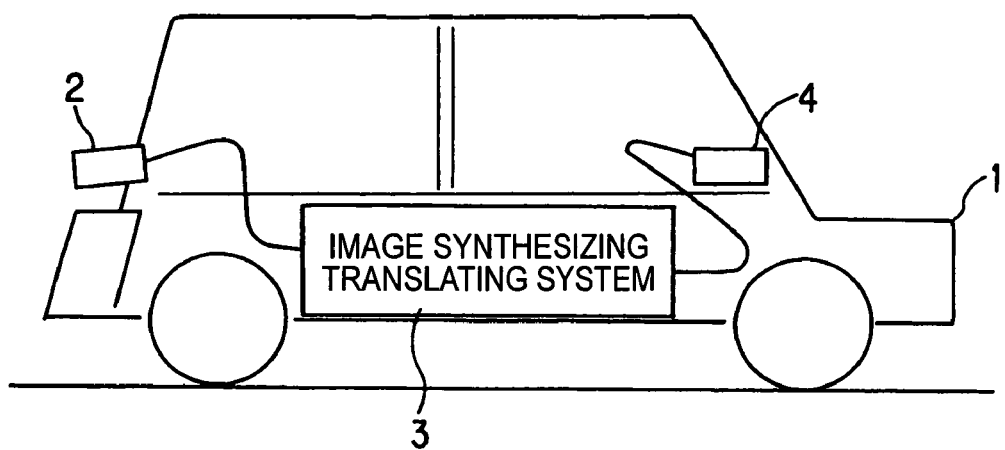
FIG. 1 is a configurative view showing a fitting of a driving assistance system according to an embodiment of the present invention to a vehicle.

In Figures, a reference numeral 1 is an own vehicle, 1a is a bumper image, 2 is an imaging device, 3 is an image synthesizing translating system, 4 is a display device (monitor), 10 is a distance-indicating guide line, 11 is a width indicating guide line, 12 is a linear guide line on a road surface, 21, 23 are cameras, 22, 24 are frame memories, 31 is an image synthesizing means, 32 is a mapping table looking-up means, 32a is a translation address memory, 32b is a degree-of-necessity memory, 33 is an image signal generating means, 300 is a three-dimensional projection model, 301 is a cylindrical surface model (ellipse), 302 is a spherical surface model (ellipse), 506 is a flat surface model, and 521, 522 are cylindrical surface models.

BEST MODE FOR CARRYING OUT THE INVENTION

An embodiment of the present invention will be explained with reference to the drawings hereinafter.

FIG. 1 is a configurative view showing a fitting of a driving assistance system according to an embodiment of the present invention to a vehicle. This driving assistance system is configured to have an imaging device 2 provided in a vehicle 1, an image synthesizing translating system 3 which processes an image picked up by the imaging device 2, and a monitor 4 which displays an image that was subjected to the image synthesizing translating process.

The imaging device 2 is provided to pick up an image of the rear of the vehicle 1. A lens distortion is eliminated from the image acquired from the imaging device 2 by the image synthesizing translating system 3, and the image is translated into an image that looks as if such image is picked up from any virtual viewpoint to display the image on the monitor (displaying means) 4.

Figure 2:
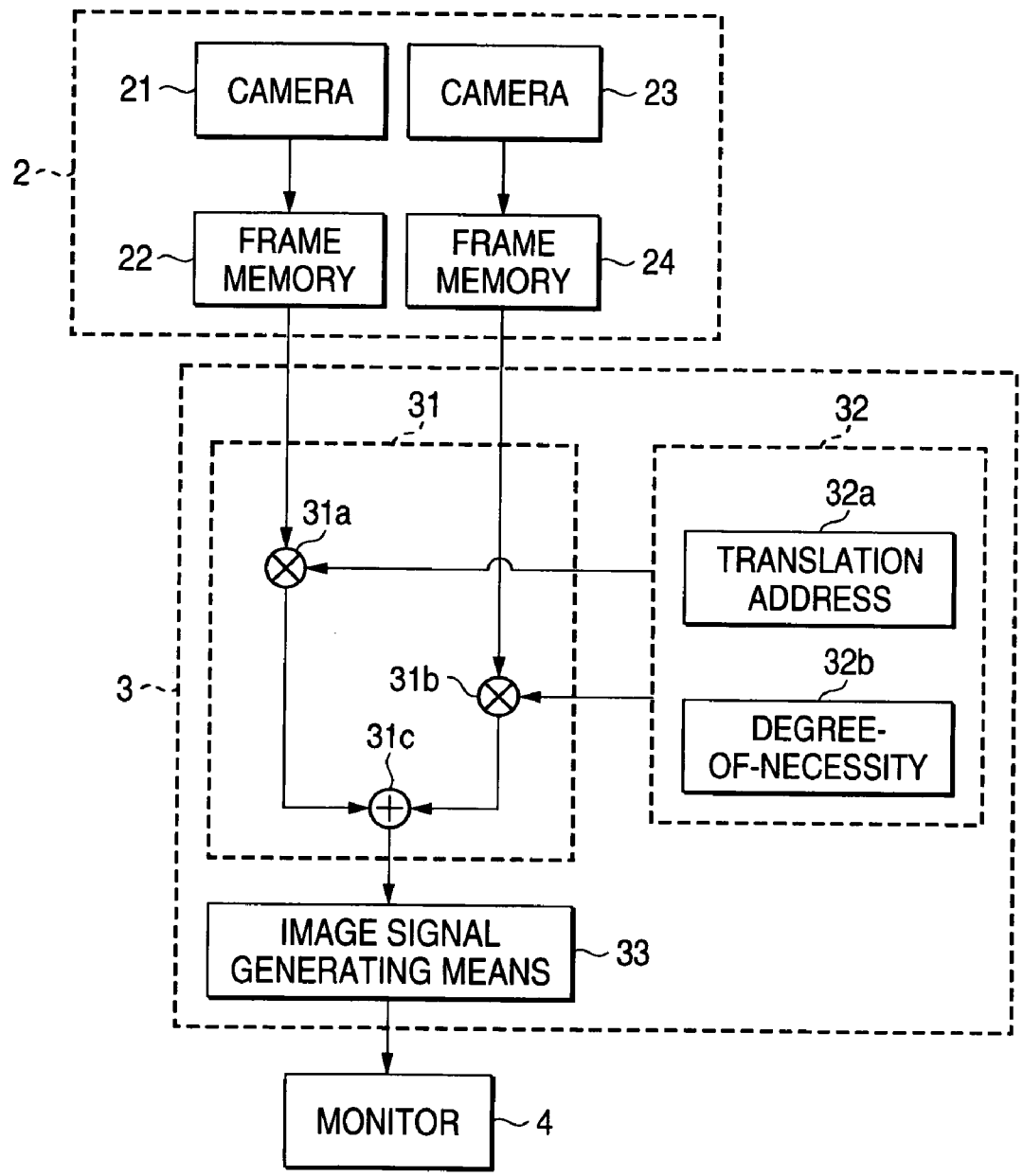
FIG. 2 is a configurative view showing details of the driving assistance system according to the embodiment of the present invention.

FIG. 2 is a configurative view showing details of the driving assistance system. The imaging device 2 includes a camera 21 provided to pick up an image of the left-side area on the back side of the vehicle, a frame memory 22 which temporarily holds image data obtained from the camera 21, a camera 23 provided to pick up an image of the right-side area on the back side of the vehicle, and a frame memory 24 which temporarily holds image data obtained from the camera 23. In the present embodiment, the left side and right side on the back side of the vehicle are picked up by the cameras 21, 23 respectively and then left and right picked-up images are synthesized. But, the left side and right side on the back side of the vehicle might be picked up by one camera at a time.

The image synthesizing translating system 3 is configured to have an image synthesizing means 31 which synthesizes left-side and right-side images on the back side of the vehicle read from two frame memories 22, 24 of the imaging device 2, a mapping table looking-up means 32 which stores mapping information of respective pixels of the image that is synthesized by the image synthesizing means 31, and an image signal generating means 33 which translates the image synthesized by the image synthesizing means 31 into an image signal.

The mapping table looking-up means 32 includes a translation address memory 32a which stores translation addresses (a mapping table) indicating correspondences between positional coordinates of respective pixels of an output image (an image displayed on the monitor 4) and positional coordinates of respective pixels of input images (images picked up by the cameras 21, 23), and a degree-of-necessity memory 32b which stores degrees-of-necessity of respective pixels of the input images.

Here, a "degree-of-necessity" is a value to calculate of addition when a sheet of output image is generated by connecting left-side and right-side input images, for example, such that a degree-of-necessity of the right-side input image is "0.5", a degree-of-necessity of the left-side input image is "0.5", etc. when values of respective pixel data of the area where the left-side and right-side input images combines each other are to be decided. Also, the above translation addresses are previously generated on the basis of the three-dimensional projection model described later in detail, and stored in the translation address memory 32a.

The image synthesizing means 31 generates data of the output pixels by synthesizing respective pixel data in the frame memories 22, 24 by mixers 31a, 31b according to the designated degree-of-necessity based on the translation addresses (the mapping table) recorded in the mapping table looking-up means 32, and then adding the synthesized left-side and right-side pixel data by an adder 31c.

That is, the image synthesizing means 31 operates based on an appropriate synchronizing signal such as the input image signal, or the like, for example, generates the output image by synthesizing the images input from two different cameras 21, 23 in accordance with the mapping table looking-up means 32 or changing respective pixel positions, and thus connects the input images input from plural different cameras 21, 23 in real time or translates the input images into an image viewed from the virtual viewpoint.

The image signal generating means 33 translates output pixel data output from the image synthesizing means 31 to the image signal, and outputs the signal to the monitor 4.

The translation addresses stored in the mapping table looking-up means 32 are generated based on the three-dimensional projection model according to the present embodiment. This three-dimensional projection model is a model indicating correspondences when the images picked up by the cameras 21, 23 are translated to the image that looks as if such-image is picked up by the virtual camera which is installed at a virtual viewing position.

Figure 3:
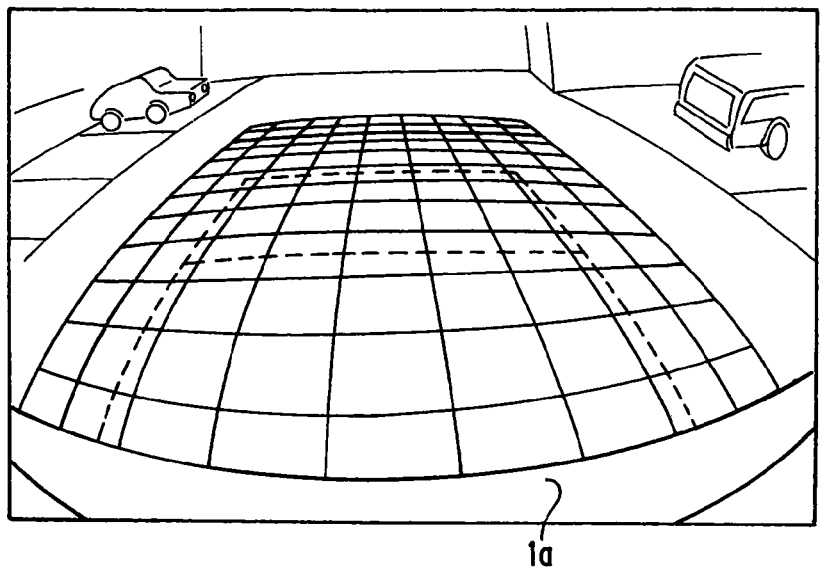
FIG. 3 is a schematic view showing an image of a wide-angle camera picked up by an imaging device in the driving assistance system according to the embodiment of the present invention.
Figure 5:
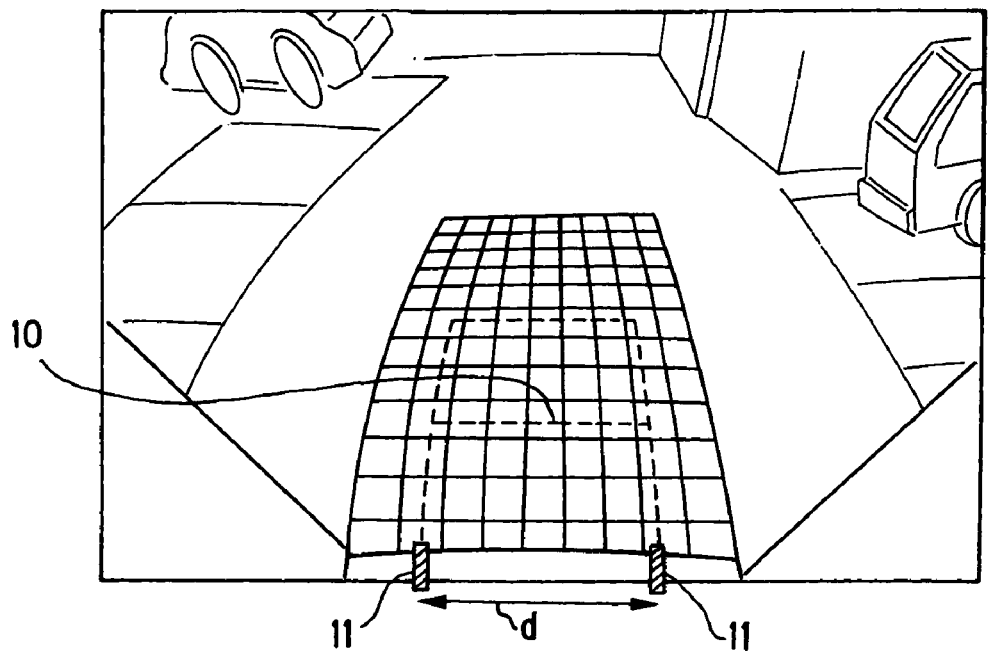
FIG. 5 is a schematic view showing a monitor display screen by the driving assistance system according to the embodiment of the present invention.
Figure 6:
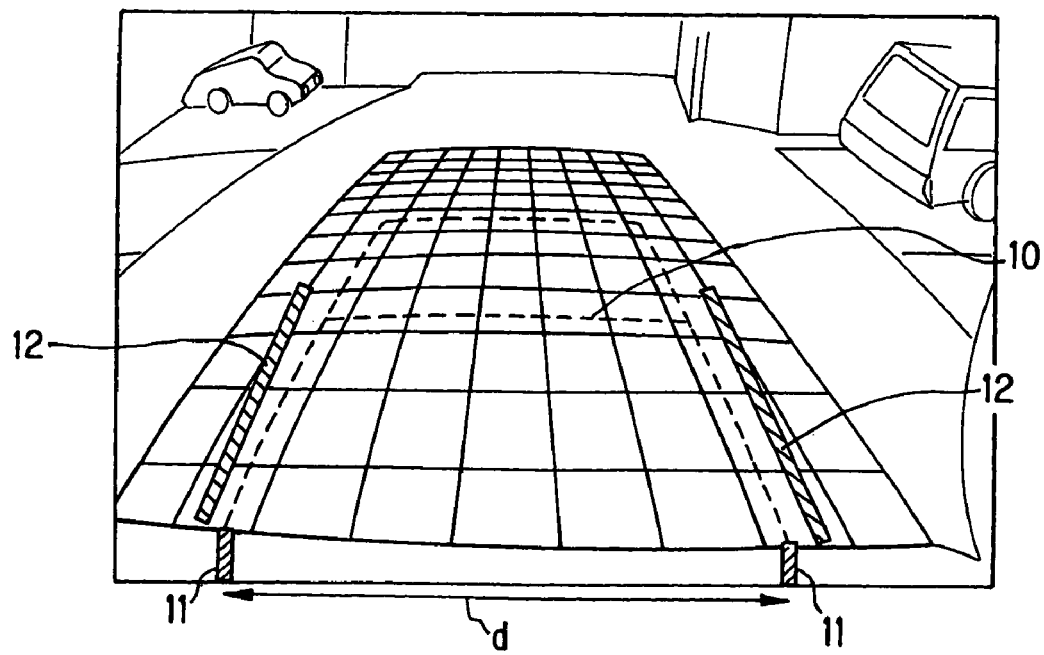
FIG. 6 is a schematic view showing a variation of the monitor display screen by the driving assistance system according to the embodiment of the present invention.

Actually, the cameras 21, 23 are wide-angle camera. The image on the rear side of the vehicle, which can be obtained by synthesizing the picked-up images laterally, is displayed as larger as the image is closer to the vehicle and is displayed as smaller as the image is further from the vehicle, as shown in FIG. 3. The illustrated example shows the image of a parking area (normally a rectangular area whose vertical dimension is almost 5 m and whose lateral dimension is almost 3 m is shown. This parking area is indicated by a lattice pattern to be easy to understand.) of the rear of the vehicle, which is picked up by the wide-angle camera. In the present embodiment, as shown in FIG. 5 and FIG. 6, the image in FIG. 3 is displayed on the monitor 4 as the clear and less-distorted image by the translation addresses generated by using the three-dimensional projection model described later.

Figure 7:
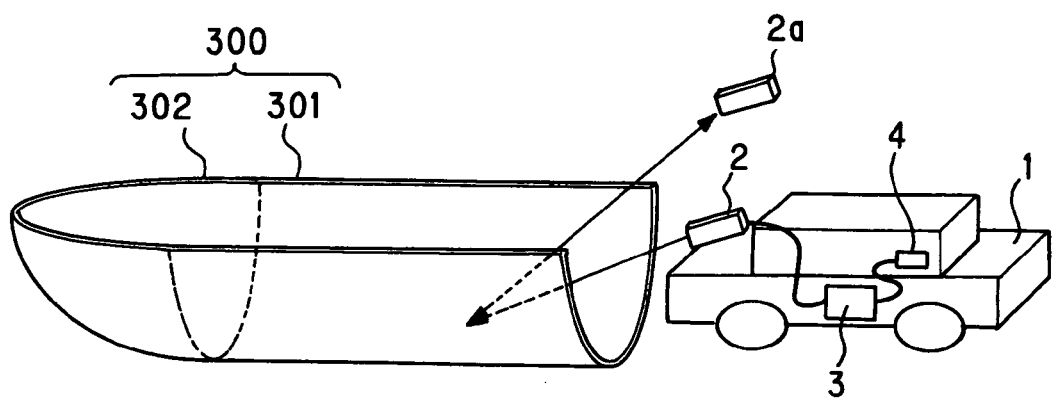
FIG. 7 is an explanatory view showing a three-dimensional projection model used in the driving assistance system according to the embodiment of the present invention.
Figure 13:
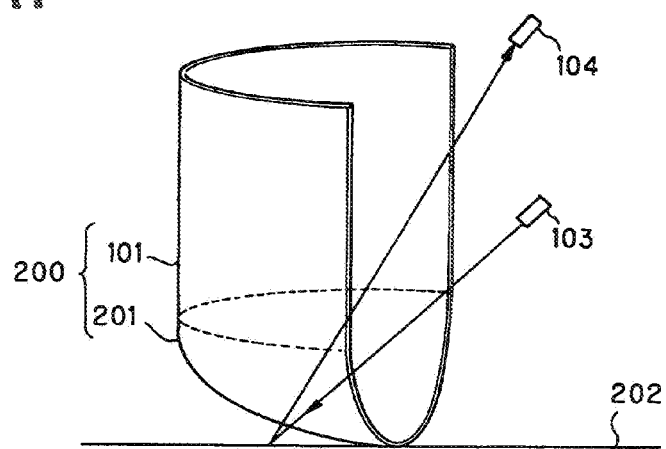
FIG. 13 is an explanatory view showing another three-dimensional projection model used in the driving assistance system in the prior art.
Figure 13:
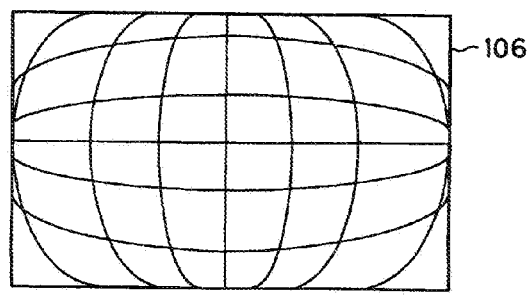

FIG. 7 is a view showing a three-dimensional projection model used in the present embodiment. A three-dimensional projection model 300 used in the present embodiment is configured to include a cylindrical surface model 301 on which the far image is projected, and a spherical surface model 302 which is connected smoothly to the cylindrical surface model 301 and on which the near image is projected. An alignment direction of this three-dimensional projection model 300 is different from the conventional three-dimensional projection model 200 explained in FIG. 13. That is, the present embodiment is characterized in that an axis of the cylindrical surface model 301 is arranged in parallel with the ground (road surface), i.e., the traveling direction of own vehicle 1, and a lower convex surface of the cylindrical surface model 301 is arranged on the ground side.

The imaging device 2 installed in the own vehicle 1 to pick up the backward image picks up the backward image in the axial direction of the three-dimensional projection model 300. The image synthesizing translating system 3 translates the picked-up image picked up by the imaging device 2 into the image that looks as if such image is picked up by a virtual camera 2a, which is installed over the actual imaging device 2, through the three-dimensional projection model 300, and then displays the image on the monitor 4.

The cylindrical surface model 301 of the three-dimensional projection model 300 is a semi-spherical model that is installed on the road surface such that a center axis of the cylindrical surface model 301 is in parallel with the traveling direction of the vehicle and is cut in half by a flat surface that passes through the center axis of the cylindrical surface model 301 in parallel with the road surface. The spherical surface model 302 is a spherical surface whose radius is identical to a radius of the cylindrical surface model 301, whose center is on the center axis of the cylindrical surface model 301, and whose cut end formed by cutting the sphere by a plane, which passes through the center and has the center axis of the cylindrical surface model 301 as a perpendicular, perfectly coincides with the cylindrical surface model 301. That is, the cylindrical surface model 301 and the spherical surface model 302 can be differentiated at all points (except end points) on the boundary.

For convenience of explanation, the above three-dimensional projection model 300 is explained as a "circular cylinder" and a "sphere". But the model is not always be a perfect "circular cylinder" and a perfect "sphere", and may be as an ellipse, an elliptic sphere respectively. For example, the ellipse that is oblate on the road surface side may be selected as the three-dimensional projection model. A view showing by the three-dimensional projection model consisting of this ellipse, which is cut by a flat plane perpendicular to the traveling direction of the vehicle 1, is FIG. 8. In this case, FIG. 8 shows not only the lower half of the ellipse constituting the model but also an overall ellipse.

Figure 8:
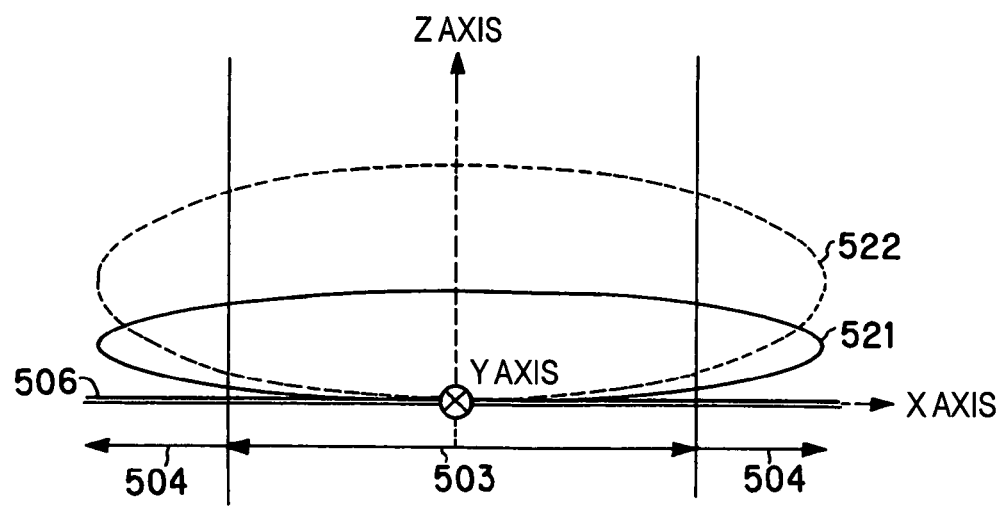
FIG. 8 is an explanatory view showing a three-dimensional projection model according to the embodiment of the present invention.
Figure 9A:
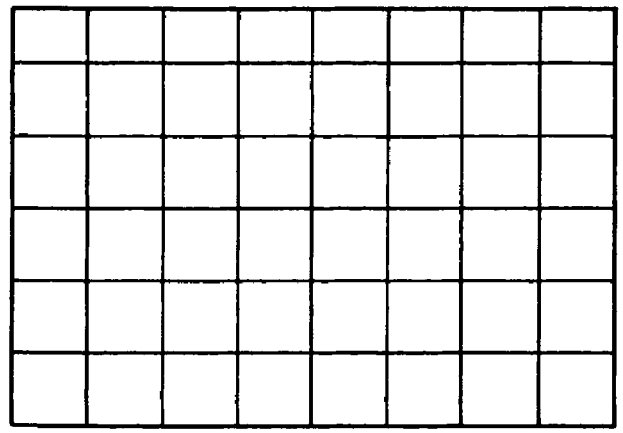
FIGS. 9A to 9C are explanatory views showing an example of an image translated by the three-dimensional projection model according to the embodiment of the present invention.

Three three-dimensional projection models are shown in FIG. 8. One model is a flat surface model 506 whose direction coincides with the road surface, and the other two models are elliptic models 521, 522 whose ellipticity is respectively different (the portion corresponding to the three-dimensional projection model 301 in FIG. 7). Only a length of a minor axis is different between the elliptic models 521, 522. Views obtained by picking up an image of a lattice pattern, which is depicted on the road surface at an equal interval, by the imaging device 2 shown in FIG. 7, and then translating the image into an image that looks as if such image is picked up by the virtual camera 2a shown in FIG. 7 through three models 506, 521, 522 shown in FIG. 8 are FIGS. 9A-9C respectively. In this case, these images are picked up when the virtual camera 2a is directed just downwards.

As shown in FIG. 8, assume that an axis that is in parallel with the center axes of the cylindrical surfaces of the ellipses 521, 522 and is positioned on the road surface is set as a Y axis, an axis that intersects orthogonally with the Y axis and is perpendicular to the road surface is set as a Z axis, and an axis that intersects orthogonally with the Y axis and the Z axis is set as an X axis, their values on the Y axis are the same in respective models 506, 521, 522, but their heights become different (values on the Z-axis direction) as the position becomes more distant from the Y axis in the X-axis direction.

Figure 9B:
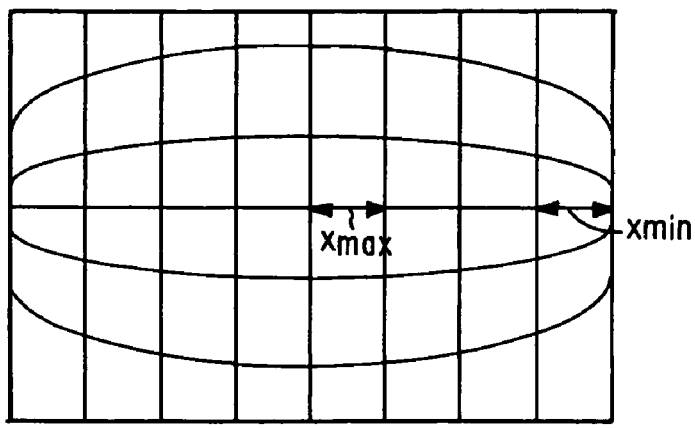
Figure 9C:
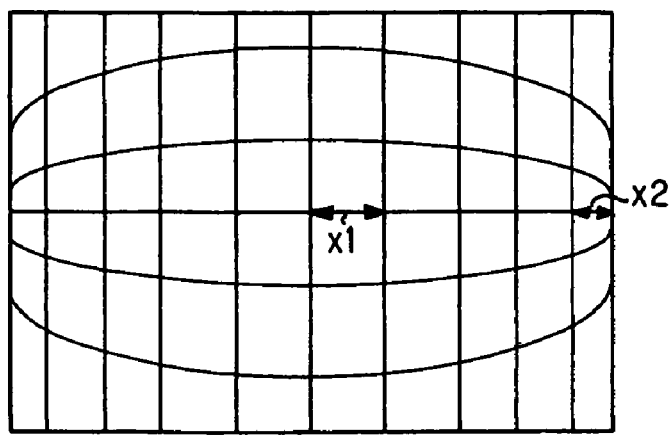
Figure 10:
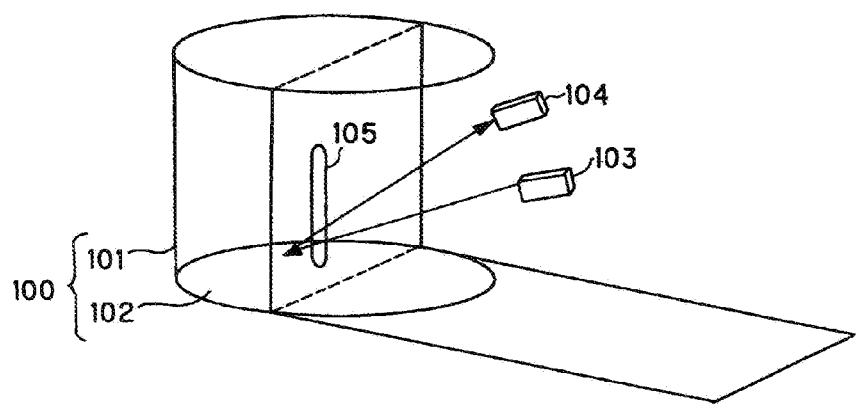
FIG. 10 is an explanatory view showing a three-dimensional projection model used in the driving assistance system in the prior art.
Figure 11:
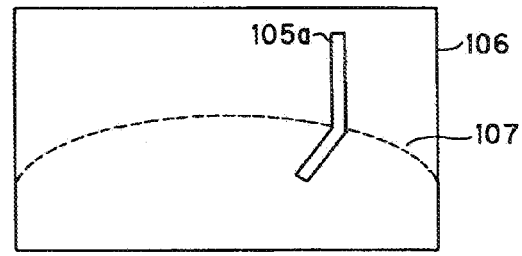
FIG. 11 is a schematic view showing an image translated by the three-dimensional projection model used in the driving assistance system in the prior art.
Figure 12:
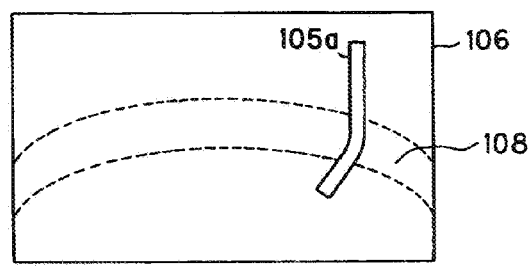
FIG. 12 is a schematic view showing a variation of the translated image by the driving assistance system in the prior art.

In other words, out of the lattice pattern depicted on the road surface, the lines that are in parallel with the Y axis are also depicted as parallel lines on the screens that are translated with using respective models 506, 521, 522. In the model 522 having a small ellipticity, i.e., in which a position goes away from the road surface as the position becomes more distant in the X-axis direction, an interval x2 of the lattice pattern on the end side of the screen becomes narrower than an interval x1 of the lattice pattern around the center, as shown in FIG. 9C.

Therefore, in the three-dimensional projection model 300 (the cylindrical surface model 521 of the ellipse shown in FIG. 8 is used as the cylindrical surface model 301 of the actually used model 300, and the spherical surface model of the ellipse being continued smoothly to the cylindrical surface model 521 of the ellipse is used as the spherical surface model 302) used in the present embodiment, it is decided as follows to what extent the ellipticity of the ellipse that is used as the cylindrical surface model 521 should be set.

That is, the X axis shown in FIG. 8 corresponds to the width direction of own vehicle 1 shown in FIG. 7. Therefore, any range 503 is taken out from a range of 80% to 120 of 3 m which is a width of a normal box of a parking lot having the Y axis as its center. Then, the three-dimensional projection model 521 of the ellipse is set such that a ratio of a maximum value Xmax and a minimum value Xmin of the interval of the lattice pattern, which is formed at an equal interval on the road surface, is at least 80% or more, as shown in FIG. 9B, within the image that is subjected to the translation through the three-dimensional projection model 521 contained in this range 503.

Such three-dimensional projection model 521 can be easily set by adjusting lengths of a major axis and a minor axis of the ellipse., Views obtained by deciding the cylindrical surface model 301 in FIG. 7 based on the ellipse in this manner and displaying the translated image of the lattice pattern are FIG. 5 and FIG. 6. In these translated images, the straight line extending in the same direction as the traveling direction of own vehicle 1 is also displayed as the straight line in the translated image, and the image distortion in the translated image along the width direction can be suppressed into the gentle distortion to such an extent that the driver does not feel a sense of incompatibility.

In the driving operations of the vehicle, since the straight lines such as the side line of the road, the side line of the box of the parking lot, etc., which are in parallel with the Y axis, are often used as a mark, it is a big advantage in the driving operations that the straight line along the Y axis can also be displayed as the straight line in the translated image. In the present embodiment, since the cylindrical surface model 301 is employed as the model on which the picked-up image of the road surface is projected, the straight line is translated into the straight line. As a result, the present embodiment can enjoy this advantage.

Meanwhile, in a far range 504 that extends in the width direction beyond the range 503 shown in FIG. 8, if the picked-up image is projected onto the flat surface, a solid body is largely distorted and thus the driver feels strange. Therefore, in order to reduce this image distortion, it is preferable that the projecting surface should be set as a surface that gets up from the road surface. However, if this projecting surface is set to a surface that suddenly gets up from the cylindrical surface model 301, the image distortion is concentrated onto the boundary portion. Therefore, it is preferable that the projecting surface getting up gradually should be selected. Since the elliptic model 521 gradually gets up in the range 504, the image distortion can be dispersed over the entire screen by using this elliptic model 521 in the range 504. Therefore, it is feasible to provide the translated image that causes the driver to feel less a sense of incompatibility.

This is similarly true of the Y-axis direction. If the far picked-up image in the Y-axis direction is projected onto the flat surface, the solid body is largely distorted and thus the driver feels strange. Therefore, it is also needed in the Y-axis direction that the projecting surface is caused to get up in the far range. Since the Y-axis direction corresponds to the traveling direction of the vehicle, i.e., the longitudinal direction of the vehicle, the image translation is executed in a predetermined range from the rear end of the vehicle by using the model 521 whereas the image translation is executed in a range, which extends beyond the predetermined range from the rear end of the vehicle, by using the elliptic sphere (the model 302 in FIG. 7) continued from the model 521.

Since the normal box of a parking lot is 5 m in length, it is desired that this predetermined range in the Y-axis direction should be set any value in 80% to 120% of a 5 m range. Also, it is preferable that no inclination is provided to the Y-axis direction in this predetermined range. In the cylindrical surface model 301 of the three-dimensional projection model 300 according to the present embodiment, a height of the lowermost position from the road surface is set to zero (coincides with the road surface) over the length of the cylindrical surface model 301. Accordingly, the straight line in the picked-up image in the predetermined range is also displayed as the straight line in the translated image.

However, in many case almost a half of the picked-up image by the imaging device 2 shown in FIG. 7 is located within an about 2 m range from the rear portion of the vehicle. In such image, it is not always needed to keep above 5 m. An inclination may not be provided to the Y-axis direction only within the 2 m range in which a sufficient space resolution is achieved, but the inclination may be gradually increased in a range extending beyond 2 m, like the X-axis direction.

In the translated images in FIG. 5 and FIG. 6 according to the present embodiment, the straight line is displayed as the straight line on this side of a distance-indicating guide line 10 indicating the 2 m range from the rear portion of the vehicle, while the image translation is carried out by using the elliptic sphere model 302 in the range extending beyond 2 m. The predetermined range is different according to the installation position of the imaging device 2, the resolution, the position of the virtual viewpoint, etc. In this case, it is desired from a point of view of the driving assistance that the ellipse model 301 should be applied in the box of the parking lot range from the rear end of the vehicle 1, which is selected as the predetermined range, and also the elliptic sphere model 302 should be applied in the farther range.

In the present embodiment, the three-dimensional projection model is configured with the cylindrical surface model 301 as the ellipse and the spherical surface model 302 as the ellipse. Accordingly, the cylindrical surface model 301 as the ellipse and the spherical surface model 302 as the ellipse are continuously coupled. As a result, as shown in FIG. 5 and FIG. 6, the translated image is smoothly connected in the boundary surface between the model 301 and the model 302 of the three-dimensional projection model 300. Thus, the driver cannot discriminate the boundary and never perceive a sense of incompatibility.

As described above, an extent of image distortion of the solid body in the range 504 can be adjusted by adjusting the inclination of the projection model in this range 504 shown in FIG. 8. For example, as shown in FIG. 5, if an appropriate inclination is provided to the projection model in the range 504, a distortion level of the image picked up by the imaging device using a wide-angle lens can be adjusted, so that a scale factor of other vehicle in a distant place can be set to get the sense of distance obtained when the driver actually looks out of the rear window.

Figure 4:
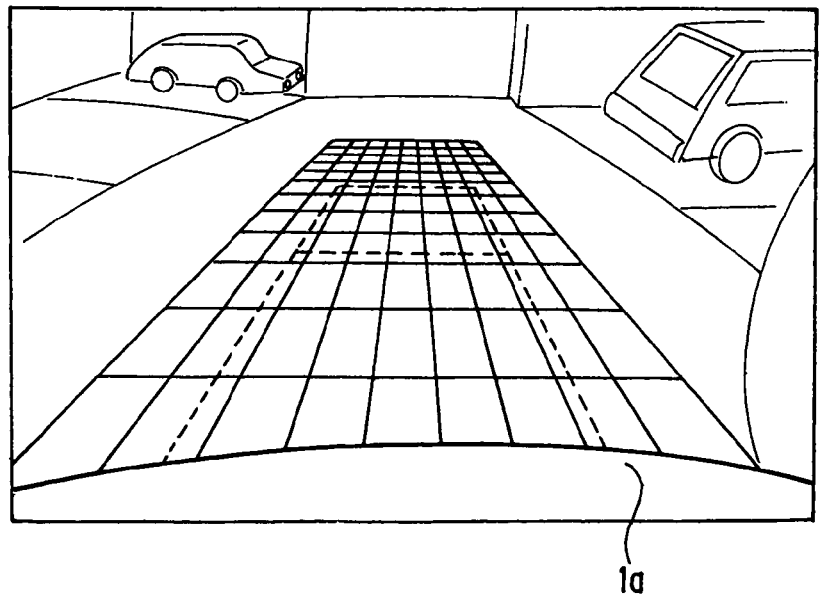
FIG. 4 is a schematic view showing an image obtained by eliminating a lens distortion from the image of the wide-angle camera picked up by the imaging device in the driving assistance system according to the embodiment of the present invention.

FIG. 4 illustrated by way of comparison shows the image of a wide-angle lens in FIG. 3 from which a lens distortion of the wide-angle lens is eliminated. It is appreciated that, even though only the lens distortion is eliminated, an effect of emphasizing the sense of distance by using the wide-angle lens is not relaxed. That is, a distant image looks more distant, the sense of distance is still emphasized in the image. In contrast, in the present embodiment, since the far image is translated by using the elliptic sphere model 302, the sense of distance is relaxed to provide a clear image, as shown in FIG. 5.

If the major axes and the minor axes of the cylindrical surface model 301 and the elliptic sphere model 302 in FIG. 7 and the viewing position of the virtual camera 2*a* are adjusted, the image shown in FIG. 5 can be translated into the image shown in FIG. 6 and then displayed on the monitor 4. That is, a width d of the own vehicle 1 on the road surface can be displayed on the screen in an enlarged fashion. In this FIG. 6, the image shown in FIG. 5 is translated and displayed such that both end positions of the vehicle enter into a 15% range of the screen width from both end positions of the screen.

According to such enlarged display, the image near the rear end of the own vehicle 1, which is a blind spot of the driver, is displayed fully on the screen of the monitor 4. Therefore, it gives the driver a sense of security. As a result, the driver can perform the driving operations with a sense of security.

Similarly, if the major axes and the minor axes of the ellipses of the cylindrical surface model 301 and the elliptic sphere model 302 in FIG. 7 and the position of the virtual camera 2*a* are adjusted, a bumper image 1*a* of the own vehicle 1 can be displayed as the straight line, as shown in FIG. 5 and FIG. 6. Compared with that the bumper image 1*a* is displayed in curve, as shown in FIG. 3 or FIG. 4, the driver feels a sense of less-incompatibility to do the driving operations easily.

In addition, in the present embodiment, as shown in FIG. 6, for example, a mark 11 indicating a width of the vehicle and a guide line 12 corresponding to a straight line on the road surface, which indicates a side that is in parallel with the traveling direction of the vehicle and is positioned slightly outer than the width d of the vehicle, are displayed. According to these displays, the driver can intuitively grasp the mutual positional relationship between the side line of the road or the box of the parking lot and the driver's own vehicle from the screen to assist the exact driving operation.

In this case, the above three-dimensional projection model configured with the cylindrical surface model and the spherical surface model is not always configured by the curved surfaces that are defined by the equations, and decided based on the application range and the property. For example, the cylindrical surface model 301 as the ellipse is not always shaped into the elliptic shape in compliance with the elliptic equation. The three-dimensional projection model that is convex downwards and is shaped to disperse the distortion of the translated-image over the entire image may be employed. The same is applied to the spherical surface model 302.

The present invention is explained in detail with reference to the particular embodiment. But it is obvious for the person skilled in the art that various variations and modifications may be applied without departing a spirit and a scope of the present invention.

This application was made based on Japanese Patent. Application No.2002-171484 filed on Jun. 12, 2002, and the content thereof is incorporated hereinto by the reference.

INDUSTRIAL APPLICABILITY

According to the present invention, it is feasible to provide the driving assistance system that is capable of monitoring/displaying the surrounding image of the vehicle as the less-distorted image.

The invention claimed is:

1. A driving assistance system comprising:
   imaging means for picking up a surrounding image of a vehicle on a road surface;
   image translating means for executing an image translation by using a three-dimensional projection model, in which an object outside of said vehicle on a side and above of the road surface is picked up by said imaging means and an image of said object is projected as a convex curve and a height from the road surface of said image of said object does not appear to vary from an image of a different object of a similar height when the different object is within a predetermined range from a top end portion of the vehicle in a traveling direction, to translate the image picked up by the imaging means into an image viewed from a virtual viewpoint; and
   displaying means for displaying the image translated by the image translating means, wherein
   the three-dimensional projection model has a cylindrical surface on which a shape on the side of the road surface is projected as a convex curve, and a spherical surface which is smoothly connected to an end portion of the cylindrical surface, wherein
   said cylindrical surface has an axis that is parallel with the road surface for some substantial length.

2. The driving assistance system according to claim 1, wherein a projection surface that gradually gets up from the road surface in a range extending beyond the predetermined range in a width direction of the vehicle is continuously provided in the three-dimensional projection model.

3. The driving assistance system according to claim 1, wherein a projection surface that gradually gets up from the road surface in a range extending beyond the predetermined range in the traveling direction of the vehicle is continuously provided in the three-dimensional projection model.

4. The driving assistance system according to claim 1, wherein the three-dimensional projection model is formed by successive curved surfaces that can be differentiated in a full range except end points.

5. The driving assistance system according to claim 4, wherein the predetermined range is projected onto the cylindrical surface having a length in the traveling direction of the vehicle, which is set to 120% or less of 5 m that is a length of a normal box of a parking lot, and having an arbitrary width, which is set to a range of 80% to 120% of 3 m that is a width of the normal box of the parking lot.

6. The driving assistance system according to claim 5, wherein the cylindrical surface is a cylindrical surface of an ellipse, and the ellipse whose ratio of a maximum width and a minimum width between equal-interval lattice lines, which are in parallel with a center axis of the cylindrical surface on the road surface projected onto the cylindrical surface, is at least 80% in the predetermined range is used as the three-dimensional projection model.

7. The driving assistance system according to any one of claim 4, wherein the three-dimensional projection model and a position of the virtual viewpoint are set such that both left and right ends of a rear end image of the vehicle displayed on a screen of the displaying means enter into an at least 15% range of a screen width from both end positions of the screen.

8. The driving assistance system according to claim 4, wherein the three-dimensional projection model and a position of the virtual viewpoint are set such that a linear shape of a rear end of the vehicle in the predetermined range is displayed as a linear image on the screen of the displaying means.

9. The driving assistance system according to claim 1, wherein a guide line indicating a straight line on the road surface, which is in parallel with the traveling direction of the vehicle and indicates an outer side that is outer than the width of the vehicle by a predetermined value, is superposed on an image translated by using the three-dimensional projection model to display on the screen of the displaying means.

10. The driving assistance system according to claim 1, wherein the image translating means translates the picked-up image by using a mapping table in which a translation address based on the three-dimensional projection model is stored.

11. A driving assistance system comprising:
    imaging means for picking up a surrounding image of a vehicle on a road surface;
    image translating means for executing an image translation by using a three-dimensional projection model, in which an object outside of said vehicle is picked up by said imaging means and an image of said object is projected as a convex curve comprised of at least part of a ellipsoid surface model smoothly connected to at least part of a cylindrical surface model having a cylindrical axis that is parallel with the road surface for some substantial length; and
    displaying means for displaying the image translated by the image translating means.

12. The system of claim 11, wherein said substantial length is at least 3 meters.

13. The system of claim 11, wherein said cylindrical surface model has an elliptical cross section.

14. The system of claim 11, wherein said ellipsoid is spherical.

15. A driving assistance system comprising:
    imaging means for picking up a surrounding image of a vehicle on a road surface;
    image translating means for executing an image translation by using a three-dimensional projection model, in which an object outside of said vehicle on a side of the road surface is picked up by said imaging means and an image of said object is projected as a convex curve comprised of at least part of a quadric surface model smoothly connected to at least part of a cylindrical surface model having a cylindrical axis that is parallel with the road surface for at least three meters, such that a height from the road surface of said image of said object does not appear to vary from an image of a different object of a similar height when the different object is within a predetermined range from a top end portion of the vehicle in a traveling direction, to translate the image picked up by the imaging means into an image viewed from a virtual viewpoint; and
    displaying means for displaying the image translated by the image translating means.

16. The system of claim 15, wherein said cylindrical surface model has an elliptical cross section.

17. The system of claim 15, wherein said ellipsoid is spherical.

* * * * *